Sept. 6, 1932.   R. A. GOEPFRICH   1,875,443
BRAKE
Filed Jan. 8, 1931

INVENTOR:
RUDOLPH A. GOEPFRICH
BY
ATTORNEY

Patented Sept. 6, 1932

1,875,443

UNITED STATES PATENT OFFICE

RUDOLPH A. GOEPFRICH, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 8, 1931. Serial No. 507,340.

This invention relates to brakes and more particularly to internal expanding brakes of the two shoe type.

The invention contemplates the provision of an adjustable anchor having two anchoring points or surfaces which may be moved in opposite directions simultaneously and uniformly. In the illustrated embodiment, the backing plate of the brake is provided with corresponding longitudinal slots arranged in spaced relation in the same plane and a perpendicular slot arranged centrally between the longitudinal slots and perpendicular to the plane in which the longitudinal slots are positioned. These slots have positioned therein anchor bolts connected by links to a binding post positioned for movement in the vertically disposed slot. Movement of the binding post in the vertically disposed slot transmits uniform and equalized movement of the anchor bolts. The binding post is in the knee of the toggle, so that adjustment of this post automatically adjusts the anchors to position the shoes or friction elements in proper spaced relation to the drum.

An object of the invention is to provide an adjustable anchor for the friction elements of an internal expanding brake.

Another object of the invention is to provide an anchor for two shoes of a brake arranged to adjust the shoes simultaneously and in proper spaced relation to the braking surface of the drum.

The salient feature of the invention is corresponding anchors movable in the same plane and connected by links of uniform length to a binding post movable in a slot positioned centrally and vertically with respect to the plane in which the anchors are movable.

The above and other objects and features of the invention including various desirable details of structure will appear from the following description taken in connection with the drawing, forming a part of this specification, and in which.

Figure 1:
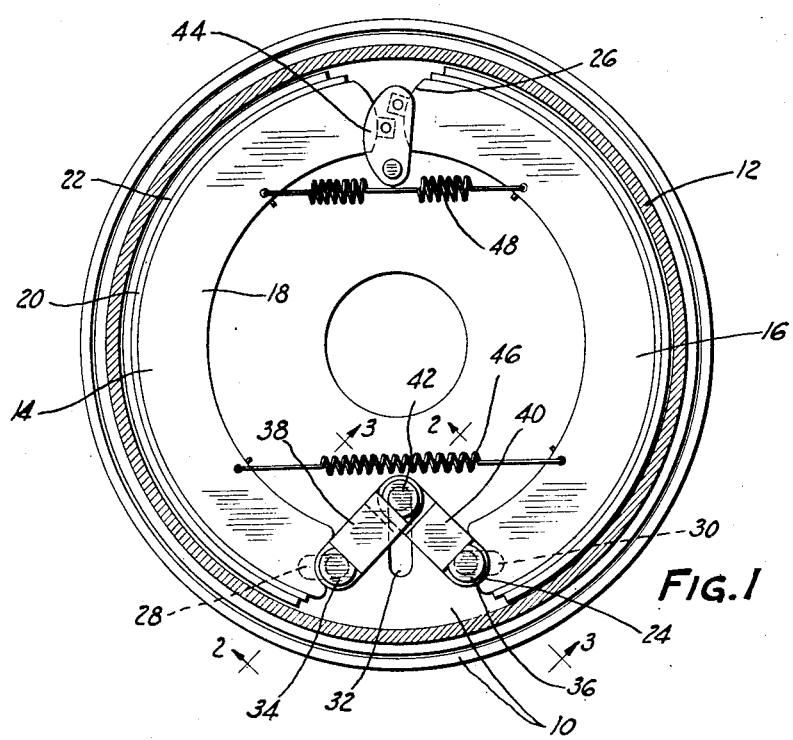
Figure 1 is a vertical sectional view just back of the head of the drum illustrating the friction elements, the operating means and the anchoring device in elevation.
Figure 2:
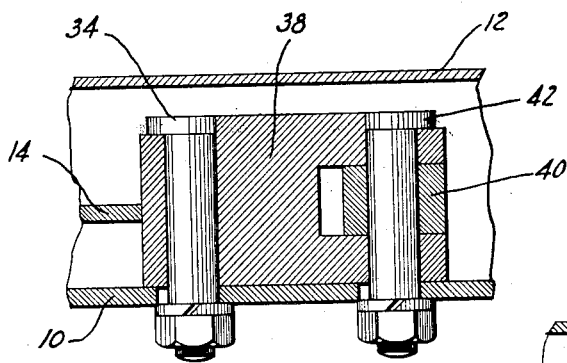
Figure 2 is a section substantially on line 2—2, Figure 1.
Figure 3:
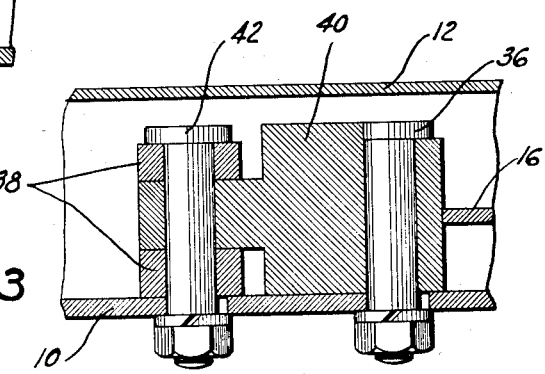
Figure 3 is a section substantially on line 3—3, Figure 1.

Referring to the drawing for more specific details of the invention, 10 represents a fixed support such as a backing plate. The backing plate has associated therewith a rotatable drum 12 which may be secured to a wheel, not shown. Positioned for movement on the backing plate are shoes 14 and 16. These shoes include a web 18 supporting a rim 20 to which is suitably secured a lining 22 adaptable for co-operation with the braking surface of the drum. The anchored ends of the shoes are notched as indicated at 24 and the separable ends are shouldered as indicated at 26.

Positioned in the backing plate are longitudinal slots 28 and 30. These slots are arranged in spaced relation and in the same plane, and centrally disposed between the slots 28 and 30 is a slot 32 in a plane perpendicular to the plane in which the slots 28 and 30 are positioned.

Suitable anchor bolts 34 and 36 are positioned for movement in the slots 28 and 30. These anchor bolts are connected by links 38 and 40 of the same length to a binding post 42 positioned in the slot 32. By backing off the nuts on the bolts 34, 36 and the binding post 42, and moving the binding post 42 in the slot 32, uniform movement of the anchors 34 and 36 may be effected to adjust the anchors uniformly so that the shoes 14 and 16 may be allocated in proper spaced relation to the braking surface of the drum.

As shown, a suitable floating cam 44 is positioned on the backing plate between the shouldered or separable ends of the shoes, the cam being of such character as to retain the separable ends of the shoes against lateral movement. Since this cam is no part of the invention, further description thereof is deemed unnecessary.

The shoes are retained upon the anchors and in engagement with the operating cam by suitable return springs 46 and 48 connected between the shoes. These springs serve to return the shoes to the off position and to retain them when in the off position in proper spaced relation to the braking surface of the drum.

Although this invention has been described in connection with certain specific embodiments, the principles involved are susceptible of numerous other applications that will readily occur to persons skilled in the art. The invention is, therefore, to be limited only as indicated by the scope of the appended claim.

Having thus described the various features of the invention, what I claim as new and desire to secure by Letters Patent is:

A brake comprising a backing plate having slots arranged in a plane common to both slots and a slot positioned centrally between the spaced slots and vertically with respect to the plane common to the spaced slots, anchors movable in the spaced slots, corresponding links pivotally connected to each other and to the anchors and a binding post slidable in the vertically positioned slot providing the pivotal connection between the links.

In testimony whereof, I have hereunto signed my name.

RUDOLPH A. GOEPFRICH.